United States Patent [19]

Birkley

[11] Patent Number: 4,639,005

[45] Date of Patent: Jan. 27, 1987

[54] CARRIAGE APPARATUS FOR SAW TABLES

[76] Inventor: Adrian N. Birkley, 3413 N. 31st St., Phoenix, Ariz. 85016

[21] Appl. No.: 740,562

[22] Filed: Jun. 3, 1985

[51] Int. Cl.[4] .............................................. B62D 61/12

[52] U.S. Cl. .............................. 280/43.14; 280/43.24; 280/47.21; 280/79.1 A

[58] Field of Search ............... 280/43.13, 43.14, 43.24, 280/47.13 R, 47.21, 47.34, 79.1 A, 79.1 R; 248/129

[56] References Cited

U.S. PATENT DOCUMENTS

| | | | |
|---|---|---|---|
| 2,192,337 | 3/1940 | Tiffany | 280/43.14 |
| 3,788,675 | 1/1974 | Wilander | 280/43.11 |
| 4,490,089 | 12/1984 | Welker | 280/43.11 |

FOREIGN PATENT DOCUMENTS

| | | | |
|---|---|---|---|
| 239095 | 10/1962 | Australia | 280/79.1 A |

*Primary Examiner*—John J. Love
*Assistant Examiner*—Richard Camby
*Attorney, Agent, or Firm*—Francis X. LoJacono

[57] ABSTRACT

A dolly used to support and transport a table saw or other tool and including a support table, wherein the dolly includes a low-lying, flat, frame structure having a front crossbar and a centrally disposed truss beam. A pair of wheels is mounted to the ends of the front crossbar, and a swivel caster is mounted to the truss beam. A front support brace is fixedly secured to the front crossbar, and a releasable support brace is releasably attached to the distal end of the truss beam, each of the support braces being attached to respective legs of the support table. A spring-loaded, latch device is mounted between the truss beam and the rear support brace, whereby the table is allowed to be raised in a fixed position above the ground level for movement of the dolly with the support table mounted thereon.

4 Claims, 6 Drawing Figures

FIG. 3
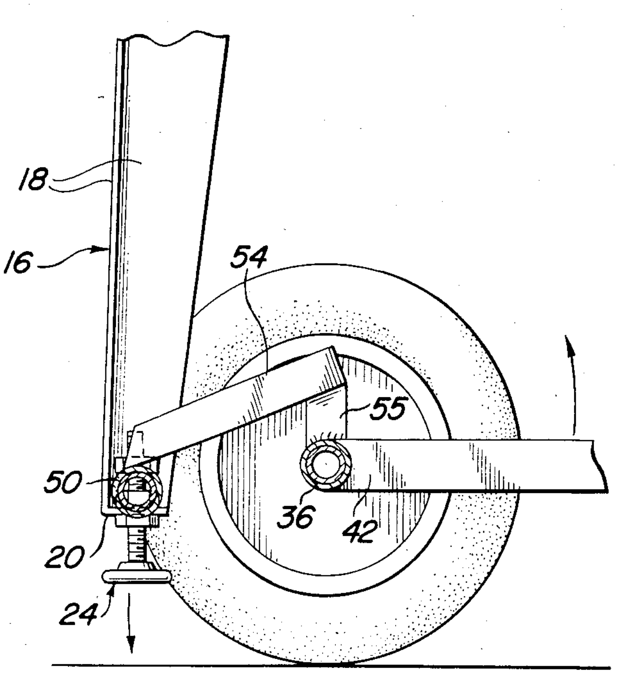
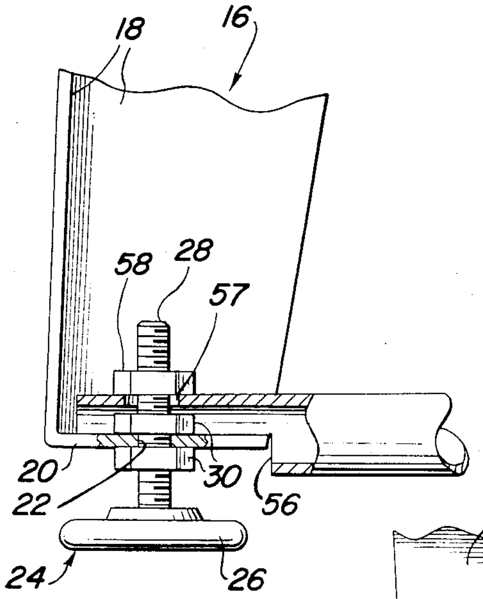
FIG. 5
FIG. 6
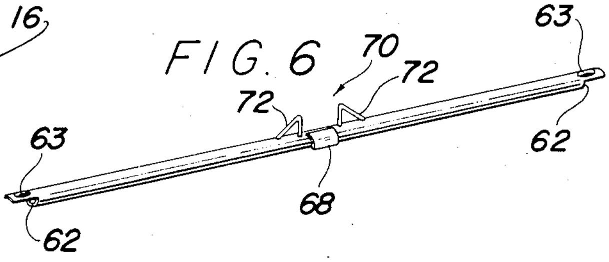
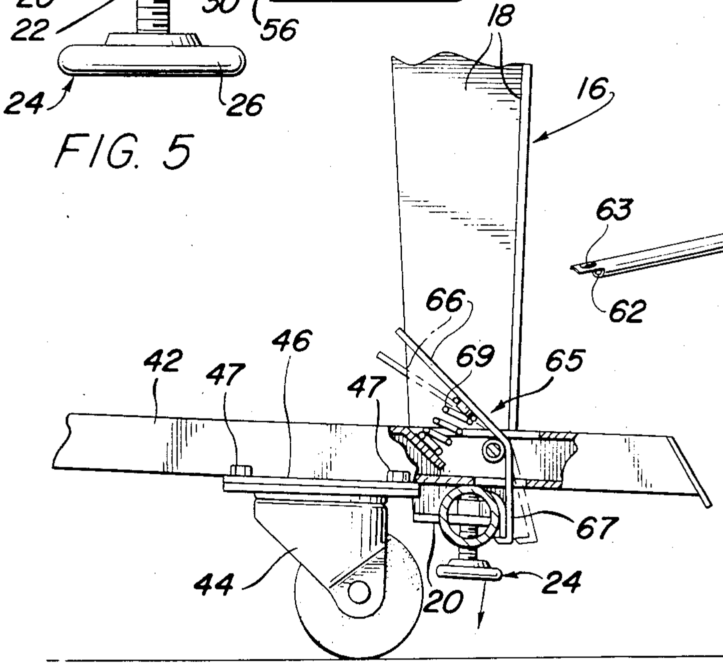
FIG. 4

CARRIAGE APPARATUS FOR SAW TABLES

BACKGROUND OF THE INVENTION

This invention relates generally to a carriage device, and more particularly to a dolly apparatus for transporting a saw together with the table on which the saw is mounted.

Various problems and difficulties are often encountered in providing suitable means for moving the different types of electrical tools such as table saws, routers, sanders, planers, etc.

Several types of transporting devices and mechanisms are presently in use. However, these known devices have features that restrict their use, and they are generally designed to fit the specific tools and their supporting structures. Problems have been encountered with other devices which have been tried because they were complicated to operate and required special tools for mounting. In general, the most common transporting means has been a set of casters. However, casters, too, have limited capabilities for moving tools and their associated support tables.

SUMMARY AND OBJECTS OF THE INVENTION

Accordingly, the present invention has for an important object to provide a simple but unique carriage or dolly apparatus for tables used to support electrical tools, and more particularly for the four-legged table adapted to support a table saw. The carriage framework is arranged in a T-shaped configuration defined by a front crossbar and an elongated truss member. Each end of the front crossbar includes a wheel, the free end of the truss member having a swivel caster. Mounted forwardly from the cross-bar is a front-support brace which is attached to the first pair of table legs. A releasable rear-support brace is arranged to be attached to the second pair of table legs, and to be releasably attached to the free end of the truss member.

Another object of the invention is to provide a carriage apparatus of this type that allows the support table and the saw to be readily rolled from one area to another by means of the triangular arrangement between the front wheels and the swivel caster.

Still another object of the present invention is to provide an apparatus of this character wherein the carriage includes a table-release device to allow the four legs of the table to rest flat and firmly on the ground surface, thus preventing accidental movement of the table when in operational use.

It is still another object of the invention to provide a carriage or dolly of this character that is easy to operate, since it has relatively few operating parts.

A further object of the invention is to provide an apparatus of this character that is easy to employ, service and maintain.

A still further object of the invention is to provide a carriage-transport-and-handling apparatus of this type that is relatively inexpensive to manufacture, and is simple yet rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings which are for illustrative purposes only, and include reference numerals so as to identify like elements as shown and described:

FIG. 3 is an enlarged cross-sectional view taken substantially along line 3—3 of FIG. 2, showing the leg of a table attached to the fixed, front crossbar;

FIG. 4 is an enlarged cross-sectional view taken substantially along line 4—4 of FIG. 2, showing the latching device in a latched position;

FIG. 5 is an enlarged cross-sectional view, illustrating how the connecting ends of the support-brace members are secured to the legs of the support table; and FIG. 6 is a perspective view of the releasable rear-support brace.

DESCRIPTION OF THE PREFERRED EMBODIMENT

Figure 1:
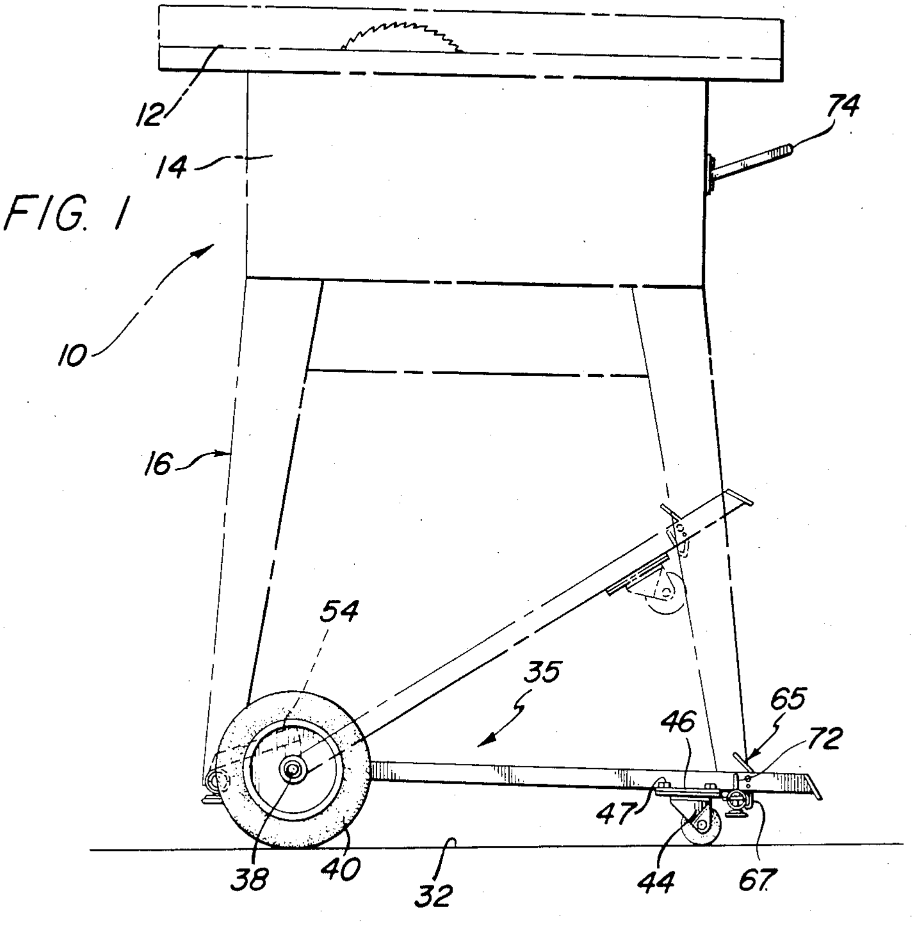
FIG. 1 is a side-elevational view of the carriage or dolly apparatus in a free-wheeling position, with a typical support table shown in phantom lines.

Referring more particularly to FIG. 1, there is shown a tool-support table, generally indicated at 10. This table is commonly for use with various electrical woodworking tools such as table saws, band saws, routers, sanders, planers, etc. However, it is more particularly for use as a support structure for a table saw (not shown), and will hereinafter be referred to as the "support table".

The support table 10 comprises a work top 12 mounted to a substantially square-shaped frame 14 to which four depending leg members 16 are secured. Each leg member is commonly formed from metal having an angular, cross-sectional configuration defined by side members 13, the terminating ends of each leg leg members 18, the terminating ends of each leg member being formed with a flange member 20 having a central hole 22 for attaching an adjustable foot means, designated at 24. The foot means includes a foot pad 26 with a threaded stud 28 on which nuts 30 are mounted. This is clearly illustrated in FIG. 5. Hence, the four spaced-apart foot pads allow support table 10 to be disposed in a fixed, level position while the tool mounted thereon is being operated.

FIG. 1 further illustrates how the support table 10 is readily raised free from the ground surface 32 by the present invention, which is a carriage or dolly generally indicated at 35. The dolly defines a low-lying, substantially flat, wheeled, frame structure which provides a simple means for transporting a support table with a table saw mounted thereon. However, the dolly includes means to raise or lower the table to a fixed operating mode.

The wheeled frame structure comprises a somewhat T-shaped framework defined by a front crossbar 36 which is preferably a tubular member to form the head of the "T". Each free end of front the crossbar is provided with extending axle pins 38 on which front-support wheels 40 are rotatably mounted. Centrally affixed to crossbar 36 is a rearwardly extended truss beam 42. Mounted adjacent the distal end of truss beam 42 is a swivel-type caster 44 which defines a steering means. A mounting plate 46 is secured in a suitable manner to the underside of truss beam 42. Caster 44 is shown mounted to plate 42 by screws or bolts 47. However, other securing means for caster 44 may be employed.

Figure 2:
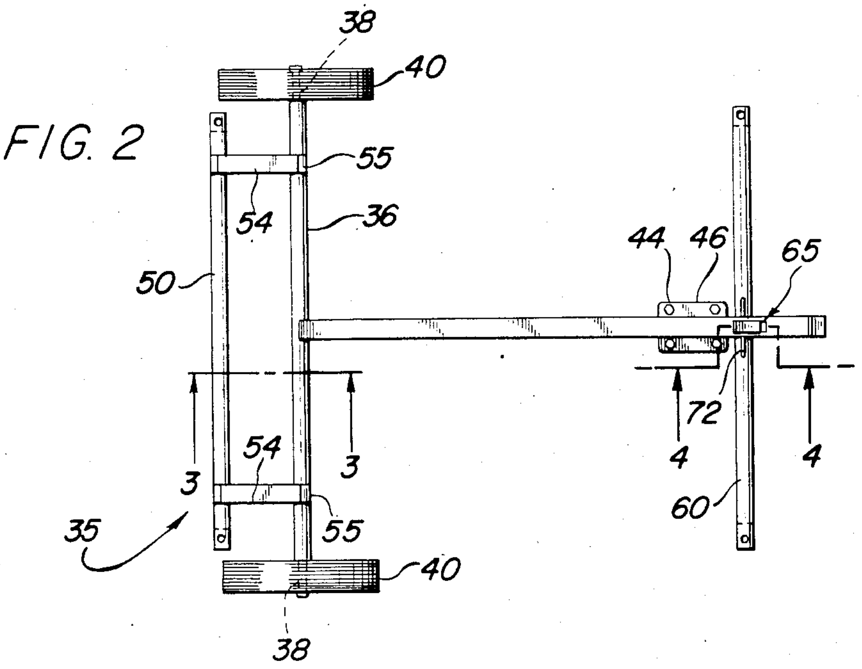
FIG. 2 is a top-plan view of the apparatus, without the table mounted thereon.

A fixed front-support brace 50 is affixed to cross 36 by means of spacer struts 54, each having a somewhat L-shaped configuration. A base member 55 is secured to the crossbar, and each spacer strut 54 is located adjacent the respective wheels 40. Thus, support brace 50 is located forwardly from and slightly below crossbar 36, as seen in FIGS. 1, 2 and 3.

Crossbar 36 is preferably formed from an elongated tubular member having the opposing ends thereof notched-out, as indicated at 54 in FIG. 5. The notches are large enough to receive flange 20 of leg 16, and a hole 57 is provided in crossbar 36 above notch 46. The hole allows stud 28 to be received therethrough, whereby each end of support brace 50 is secured to the oppositely disposed legs 16 by mounting a nut 58 to stud 28.

A second support brace 60 is fixedly mounted to and between the two remaining leg members 16, as shown in FIGS. 1 and 4. Thus, support brace 60 is located rearwardly from swivel caster 44 so as to support and raise the table 10, as seen in FIG. 1. The second or rear-support brace 60 also has its opposing ends formed with notches 62 and holes 63 (FIG. 6). Rearward support brace 60 is fixedly mounted as part of table 10, and includes means to be releasably attached to truss beam 42. That is, a latching means, indicated generally at 65, is mounted within truss beam 42 adjacent the distal end thereof, as shown in FIG. 4. Latching means 65 comprises a spring-biased, latch pedal 66 having a latch tongue 67 which is pivotally secured within truss beam 42. The latch pedal 66 is positioned above the beam, and the tongue 67 is positioned below the beam by spring 69.

Latch tongue 67 latches with the latch keeper 68 which is fixedly secured to the central portion of rear-support brace 60, as indicated at 70. The alingment means includes a pair of ear members 72 fixed longitudinally along support brace 60, whereby truss beam 42 is positioned therebetween to prevent lateralmovement between brace 60 and beam 42, so as to insure a positive connection between latch tongue 67 and latch keeper 68.

When the support table is mounted as shown in FIG. 1, table 10 is raised above the ground surface 32, thus allowing the dolly to transport table 10 in a relatively easy manner. In order to return the table to a fixed position on the ground surface 32, one merely applies a lifting action on the table 10 by means of handle 74 attached to the table, as seen in FIG. 1. However, at the time the lifting takes place, the operator thereof actuates latch means 65 with his foot, thereby disengaging latch tongue 67 from keeper 68. This release rear-support brace 60 and allows beam 42 to rise, as seen in the phantom lines of FIG. 1. The raising of beam 42 is controlled by the operator's foot, which in turn lowers the front legs of the table. When foot pads 26 rest on the ground surface, the operator lowers the rear legs by means of handle 74. In order to raise support table 10 so as to be carried by dolly 35, the operator forces beam 42 downwardly, thus causing the front legs to be raised, and the latch tongue 67 to engage keeper 68.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A dolly for transporting a support table for a table saw, said table having four legs to which said dolly is attached, said dolly comprising:

a low-lying, flat, wheeled, frame structure having a front crossbar and a rearwardly extending, central, truss beam;

wheels mounted on the opposite ends of said front crossbar;

stearing means mounted rearwardly on said truss beam for controlling the directional movement of said dolly;

a front support brace forwardly disposed on and secured to said front crossbar;

wherein said front support brace includes a plurality of spacer struts mounted between said front support brace and said front crossbar, whereby said front support brace is positioned forwardly and below said front crossbar;

a rear support brace adapted to be releasably attached to said truss beam;

said rear support brace including an alignment means mounted thereon, whereby said truss beam engages said alignment means to prevent lateral movement between said truss beam and said rear support brace;

latching means mounted to said truss beam and positioned to releasably attach said rear support brace to said truss beam;

wherein said latching means comprises:

a latch pedal pivotally mounted in said truss beam;

a latch tongue formed on one end of said latch pedal;

a keeper member affixed to said rear support brace, and positioned to be releasably engaged by said latch tongue; and a spring interposed between said latch pedal and said truss beam to bias said latch tongue in a latched position;

means for attaching said front support brace and said rear support brace to the respective legs of said support table.

2. A dolly as recited in claim 1, wherein said attaching means for said front and rear support braces comprise:

a notch formed in the respective ends of said support braces; and a hole to receive a stud mounted in said legs of said support table.

3. A dolly as recited in claim 2, wherein said alignment means comprises a pair of members fixed longitudinally along said rear support brace, whereby said truss beam is positioned therebetween when said dolly is in a transporting arrangement.

4. A dolly as recited in claim 3, wherein said steering means comprises a swivel caster mounted adjacent the distal end of said truss beam.

* * * * *